United States Patent
Okawa et al.

(10) Patent No.: US 10,520,060 B2
(45) Date of Patent: Dec. 31, 2019

(54) INTERNATIONAL COMBUSTION ENGINE WITH BALANCER DEVICE

(71) Applicant: TOYOTA JIDOSHA KABUSHIKI KAISHA, Toyota-shi (JP)

(72) Inventors: Makoto Okawa, Susono (JP); Naoya Ikeda, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/186,737

(22) Filed: Nov. 12, 2018

(65) Prior Publication Data

US 2019/0219131 A1    Jul. 18, 2019

(30) Foreign Application Priority Data

Jan. 12, 2018   (JP) .................................. 2018-003579

(51) Int. Cl.
| | |
|---|---|
| *F16F 15/26* | (2006.01) |
| *F02B 75/20* | (2006.01) |
| *F02F 7/00* | (2006.01) |
| *F02B 75/18* | (2006.01) |

(52) U.S. Cl.
CPC ............ *F16F 15/268* (2013.01); *F02B 75/20* (2013.01); *F02B 2075/1812* (2013.01)

(58) Field of Classification Search
CPC ........ F16F 15/268; F16F 15/264; F16F 15/28; F02B 75/20; F02B 2075/1812; F02F 7/0007

See application file for complete search history.

(56) References Cited

U.S. PATENT DOCUMENTS

| | | | | |
|---|---|---|---|---|
| 4,440,123 A | * | 4/1984 | Tsai ........................ | F02B 67/04 123/192.1 |
| 4,993,378 A | * | 2/1991 | Sakurahara ............ | F01M 11/02 123/195 R |
| 5,788,381 A | * | 8/1998 | Yamazaki ................ | F01M 1/02 384/400 |
| 6,189,499 B1 | * | 2/2001 | Iwata .................... | F16F 15/265 123/192.2 |
| 6,205,970 B1 | * | 3/2001 | Iwata ...................... | F02B 75/20 123/192.2 |
| 7,992,534 B2 | * | 8/2011 | Hashimoto .............. | F01M 1/02 123/192.2 |
| 2011/0283964 A1 | | 11/2011 | Fujii | |

FOREIGN PATENT DOCUMENTS

JP    2010-180747    8/2010

* cited by examiner

*Primary Examiner* — Grant Moubry
(74) *Attorney, Agent, or Firm* — Oblon, McClelland, Maier & Neustadt, L.L.P.

(57) ABSTRACT

An internal combustion engine includes: three or more cylinders including cylinders A, B and C according to the present disclosure arranged in a row in the cylinder row direction; and a balancer device for reducing engine vibration. The balancer device includes a balancer shaft arranged so as to extend from the cylinder A to the cylinder C along the cylinder row direction in a crank chamber. The balancer shaft includes: a first opening formed on the outer surface of the balancer shaft at a first location associated with the cylinder A in the cylinder row direction; a second opening formed on the outer surface at a second location associated with the cylinder C in the cylinder row direction; and a communication passage formed inside the balancer shaft so as to connect the first opening with the second opening.

5 Claims, 8 Drawing Sheets

Gas flow in #1 intake (expansion) stroke

Fig. 7

Gas flow in #3 intake (expansion) stroke

Gas flow in #1 intake (expansion) stroke

Fig. 11

Gas flow in #3 intake (expansion) stroke

INTERNATIONAL COMBUSTION ENGINE WITH BALANCER DEVICE

CROSS-REFERENCE TO RELATED APPLICATION

This application is based on and claims the benefit of Japanese Patent Application No. 2018-003579, filed on Jan. 12, 2018, which is incorporated by reference herein in its entirety.

BACKGROUND

Technical Field

The present disclosure relates to an internal combustion engine, and more particularly to an internal combustion engine that includes a balancer device for reducing engine vibration.

Background Art

For example, JP 2010-180747 A discloses a multi-cylinder internal combustion engine. This internal combustion engine is equipped with a cylinder block and a crankcase fixed thereto. Inside the internal combustion engine, a plurality of bulkheads that support a crankshaft are formed by the cylinder block and the crankcase. A plurality of crank chambers are sectioned by the plurality of bulkheads. The plurality of crank chambers respectively correspond to a plurality of cylinders.

In order to more surely reduce pumping loss, the internal combustion engine described above includes first through-holes and second through-holes. The first through-holes are formed in the bulkheads for separating adjacent crank chambers in order to communicate the adjacent crank chambers with each other. Each of the second through-holes is formed in at least one of the cylinder block and the crankcase in order to directly communicate non-adjacent crank chambers with each other.

SUMMARY

The second through-holes of the internal combustion engine disclosed in JP 2010-180747 A described above is formed by a pipe that penetrates through the plurality of bulkheads that are disposed between these non-adjacent crank chambers, in order to directly communicate the non-adjacent crank chambers with each other.

In order to provide, with this kind of pipe, at least one of the cylinder block and the crankcase, it is required to install the pipe such that the pipe does not interfere with counterweights of the crankshaft and connecting rods. As a result, the size of the internal combustion engine may become greater and the mounting ability of the internal combustion engine on the vehicle may deteriorate.

The present disclosure has been made to address the problem described above, and an object of the present disclosure is to provide an internal combustion engine with a balancer device that can reduce pumping loss while avoiding the deterioration of the mounting ability of the internal combustion engine on the vehicle.

An internal combustion engine according to the present disclosure includes:
three or more cylinders arranged in a row in a cylinder row direction; and
a balancer device for reducing engine vibration.

The three or more cylinders include: a cylinder A arranged at an end in the cylinder row direction; a cylinder B arranged adjacent to the cylinder A; and a cylinder C provided with a piston that moves in a direction opposite to a piston of the cylinder A during a crank angle period in which the piston of the cylinder A and a piston of the cylinder B move in a same direction as each other.

The balancer device includes a balancer shaft arranged so as to extend from the cylinder A to the cylinder C along the cylinder row direction in a crank chamber.

The balancer shaft includes:
a first opening formed on an outer surface of the balancer shaft at a first location associated with the cylinder A in the cylinder row direction;
a second opening formed on the outer surface of the balancer shaft at a second location associated with the cylinder C in the cylinder row direction; and
a communication passage formed inside the balancer shaft so as to connect the first opening with the second opening.

The balancer shaft may be arranged such that, in a view of the balancer shaft from an axial direction of a crankshaft, a center of the balancer shaft is located on a reference straight line or on a side closer to a combustion chamber relative to the reference straight line, the reference straight line passing through a center of the crankshaft and being perpendicular to a cylinder center line.

The balancer shaft may include: a first unbalance mass provided on the balancer shaft at the first location; and a second unbalance mass provided on the balancer shaft at the second location. The first opening may be formed on the first unbalance mass. Also, the second opening may be formed on the second unbalance mass.

Each of the first unbalance mass and the second unbalance mass may include: a weight portion protruded outward in a radial direction of the balancer shaft at a part of the balancer shaft in its circumferential direction; and a concave portion that is a portion other than the weight portion in the circumferential direction. The first opening may be formed on the concave portion of the first unbalance mass. Also, the second opening may be formed on the concave portion of the second unbalance mass.

The first opening may be formed on the concave portion so as to be adjacent to or closer to each end surface of the weight portion of the first unbalance mass in the circumferential direction. Also, the second opening may be formed on the concave portion so as to be adjacent to or closer to each end surface of the weight portion of the second unbalance mass in the circumferential direction.

According to the internal combustion engine of the present disclosure, by the use of the communication passage formed inside the balancer shaft, a pressure difference (pressure fluctuation) between cylinders that is produced due to the ascent and descent of the pistons can be reduced between the cylinder A and the cylinder C corresponding to a non-adjacent cylinder with respect to the cylinder A without causing an increase of size of the internal combustion engine. Therefore, pumping loss can be reduced while avoiding the deterioration of the mounting ability of the internal combustion engine on the vehicle.

DETAILED DESCRIPTION

In embodiments of the present disclosure which will be described later, elements that are the same as each other in the drawings are denoted by the same reference symbols, and redundant descriptions of those elements will be omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or the like that are described in conjunction with the following embodiments are not necessarily essential to the present disclosure unless explicitly shown otherwise, or unless the present disclosure is explicitly specified by the structures or the like theoretically.

First Embodiment

Figure 1:
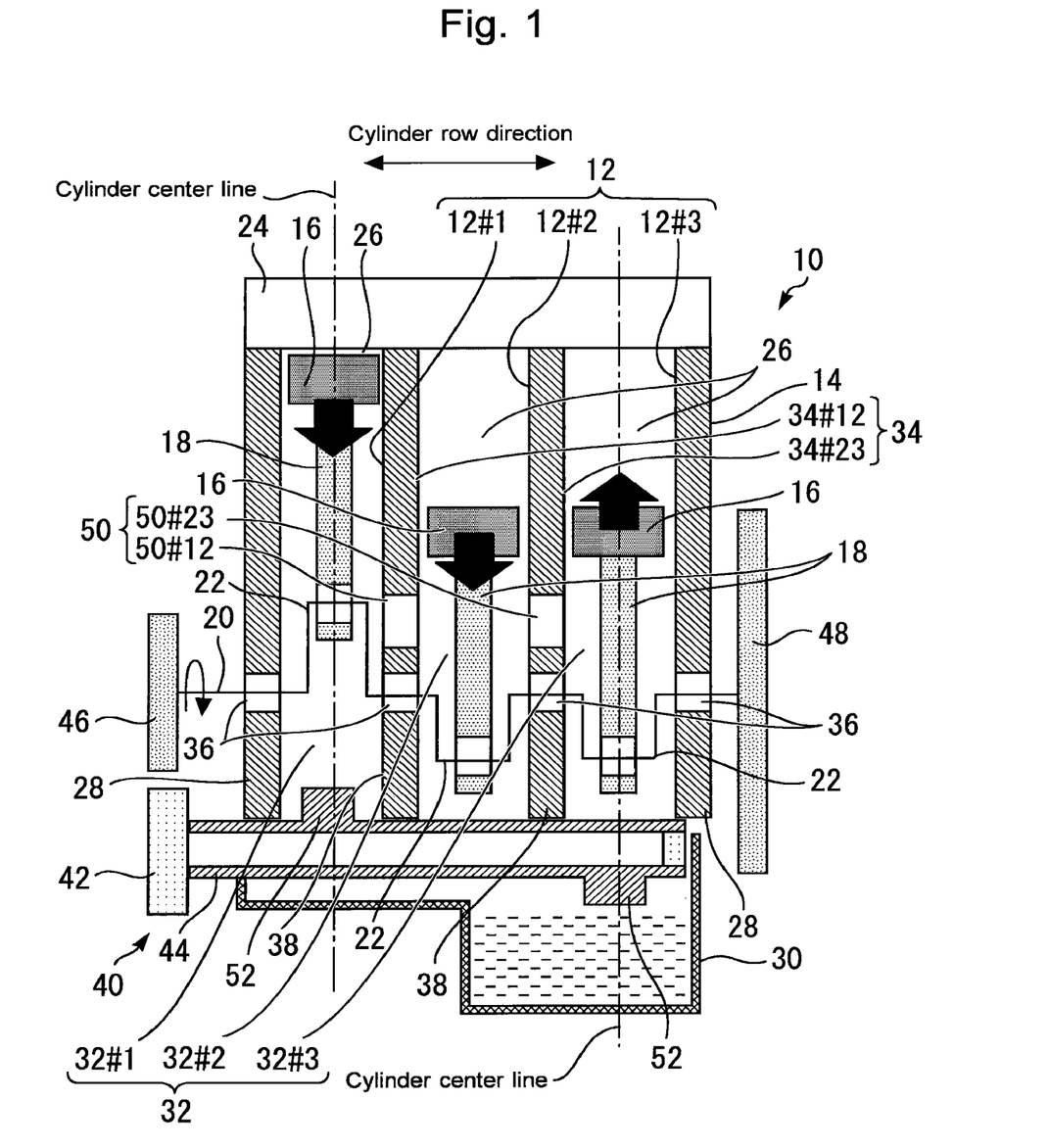
FIG. 1 is a schematic diagram for describing an example of the configuration of an internal combustion engine according to a first embodiment of the present disclosure.

Firstly, a first embodiment according to the present disclosure will be described with reference to FIGS. 1 to 8.
1-1. Example of Configuration of Internal Combustion Engine FIG. 1 is a schematic diagram for describing an example of the configuration of an internal combustion engine 10 according to the first embodiment of the present disclosure. The internal combustion engine 10 shown FIG. 1 is an in-line three-cylinder engine. More specifically, the internal combustion engine 10 is provided with three cylinders 12 arranged in a row in its cylinder row direction. These cylinders 12 are formed inside a cylinder block 14. Hereunder, when describing each cylinder distinctively, three cylinders 12 are also referred to as a first cylinder 12#1, a second cylinder 12#2 and a third cylinder 12#3 in order from a position closer to an end portion of the internal combustion engine 10 (i.e., end portion located on the side opposite to a flywheel 48).

Pistons 16 are arranged in the respective cylinders 12. Each of the pistons 16 is coupled to a crank pin 22 of a crankshaft 20 via a connecting rod 18. The pistons 16 reciprocate in the respective cylinders 12 in synchronization with rotation of the crankshaft 20.

A cylinder head 24 is arranged on the cylinder block 14. In addition, a combustion chamber 26, which is a space surrounded by the cylinder head 24, the cylinder block 14 and the piston 16, is formed atop the piston 16 in each cylinder 12.

On the other hand, a crankcase 28 is arranged under the cylinder block 14. In addition, an oil pan 30 for storing an oil that lubricates each portion of the internal combustion engine 10 is arranged under the crankcase 28. A crank chamber 32, which is a space surrounded by the cylinder block 14, the crankcase 28 and the oil pan 30, is formed on the side opposite to the combustion chamber 26 via the piston 16.

Moreover, the cylinder block 14 has a plurality of (in the example shown in FIG. 1, two) bulkheads 34 that are formed so as to separate the individual cylinders 12 from each other inside the cylinder block 14. In more detail, the bulkheads 34 correspond to wall portions of the cylinder block 14 that are located on the side lower than the bottom dead center of the respective pistons 16. The crankshaft 20 is supported, via bearings 36, so as to be rotatable by the bulkheads 34 (cylinder block 14), the crankcase 28 and crank caps 38.

Furthermore, the internal combustion engine 10 is provided with a balancer device 40 for reducing engine vibration. The balancer device 40 includes a balancer gear 42 and a balancer shaft 44. A crank gear 46 that is engaged with the balancer gear 42 is attached to the crankshaft 20. The balancer gear 42 is attached to an end of the balancer shaft 44. Thus, the balancer shaft 44 is driven to rotate by the use of a torque of the crankshaft 20 via the balancer gear 42 and the crank gear 46. It should be noted that the flywheel 48 is attached to the other end portion of the crankshaft 20 located on the side opposite to the crank gear 46.

In the example shown in FIG. 1, the balancer device 40 is installed in the crank chamber 32 at a location on the side lower than the axial center of the crankshaft 20 in a direction along the cylinder center line (i.e., on the side opposite to the combustion chamber 26). It should be noted that the configuration concerning the balancer device 40 will be described with reference to FIG. 6 since it is a characteristic portion of the present embodiment.

The crank chamber 32 communicates among three cylinders 12 at a location on the side closer to the oil pan 30. On the other hand, the crank chamber 32 is separated for each cylinder 12, by the bulkheads 34 and the crank caps 38, at a location on side closer to the piston 16. The bulkheads 34 (34#12 and 34#23) respectively include through-holes 50 (50#12 and 50#23) that are formed for causing sections of the crank chamber 32 to communicate between adjacent cylinders.

In more detail, the sections of the crank chamber 32 are referred to as a "crank chamber 32#1" of the first cylinder 12#1, a "crank chamber 32#2" of the second cylinder 12#2 and a "crank chamber 32#3" of the third cylinder 12#3. The through-hole 50#12 for connecting between the crank chamber 32#1 and the crank chamber 32#2 is formed in the bulkhead 34#12 that separates the first cylinder 12#1 from the second cylinder 12#2. Also, the through-hole 50#23 for connecting between the crank chamber 32#2 and the crank chamber 32#3 is formed in the bulkhead 34#23 that separates the second cylinder 12#2 from the third cylinder 12#3.

1-2. Problem on Reduction of Pumping Loss 1-2-1. In-Line Four-Cylinder Engine (Comparative Example)

Figure 2:
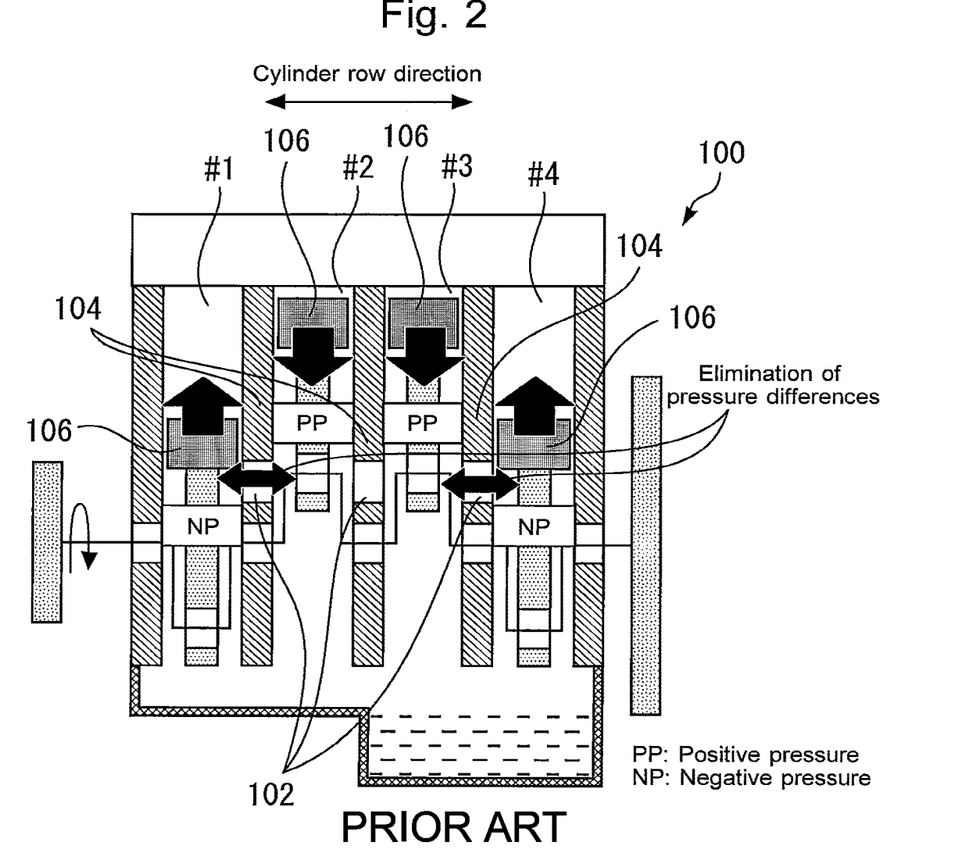
FIG. 2 is a schematic diagram for describing the operation of an in-line four-cylinder engine referred to for comparison with the internal combustion engine that is an in-line three-cylinder engine.
Figure 3:
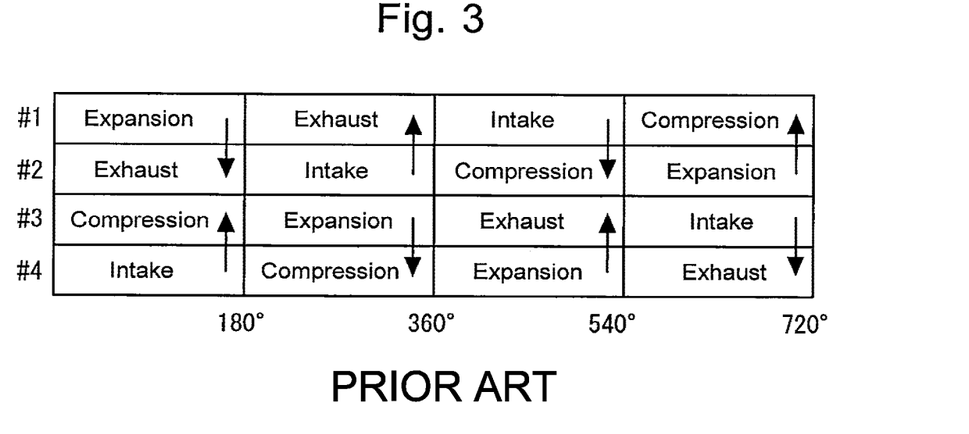
FIG. 3 is a diagram that illustrates the relationship between piston positions of the respective cylinders of the in-line four-cylinder engine and the crank angle.

FIG. 2 is a schematic diagram for describing the operation of an in-line four-cylinder engine referred to for comparison with the internal combustion engine 10 that is an in-line three-cylinder engine. FIG. 3 is a diagram that illustrates the relationship between the piston positions of the respective cylinders of the in-line four-cylinder engine and the crank angle.

An in-line four-cylinder internal combustion engine 100 shown in FIG. 2 is provided with four cylinders #1-#4 that are arranged in a row in its cylinder row direction. In this internal combustion engine 100, through-holes 102 for causing crank chambers of adjacent cylinders to communicate with each other are formed in bulkheads 104 located between the adjacent cylinders, similarly to the through-holes 50 of the internal combustion engine 10 shown in FIG. 1. In the internal combustion engine 100, a phase difference between a piston 106 in the cylinder (#1 or #4) arranged at an end in the cylinder row direction and a piston 106 in its adjacent cylinder (#2 or #3) is 180 degrees as shown in FIG. 3. In other words, in the internal combustion engine 100, there is no crank angle period in which the piston 106 in the cylinder #1 and the piston 106 in its adjacent cylinder #2 move in the same direction. This also applies to the relationship between the cylinder #3 and its adjacent cylinder #4.

Regardless of the number and arrangement of cylinders, when a piston ascends (i.e., when the piston moves from the bottom dead center side to the top dead center side), an in-crank-chamber pressure becomes negative at a location immediately under the piston, and, conversely, when the piston descends, the in-crank-chamber pressure becomes positive at the location immediately under the piston. In detail, each of the negative pressure and the positive pressure that are produced in this way becomes higher at a location closer to the piston.

According to the internal combustion engine 100, a pressure difference between the negative pressure and positive pressure that are produced due to the ascent and descent of the pistons as described above is produced between adjacent cylinders as shown in FIG. 2. In the internal combustion engine 100, the phase difference between the piston locations of each pair (#1 and #2, or #3 and #4) of adjacent cylinders is 180 degrees as described above. Because of this, as shown by arrows in FIG. 2, pressure differences produced in the respective pair of adjacent cylinders can be eliminated with each other by the use of the through-holes 102.

In addition to the above, each arrow in FIG. 3 indicates a gas flow from a cylinder on the positive pressure side (intake stroke and expansion stroke) to a cylinder on the negative pressure side (compression stroke and exhaust stroke). In this way, in the in-line four-cylinder internal combustion engine 100, the gas can be alternately moved, by the use of the through-holes 102 formed in the bulkheads 104, such that the pressure differences (pressure fluctuation) due to the ascent and descent of the pistons are alternately released between the crank chambers of the adjacent cylinders. Therefore, pumping loss can be always reduced.

1-2-2. Problem in in-Line Three-Cylinder Engine

Figure 4:
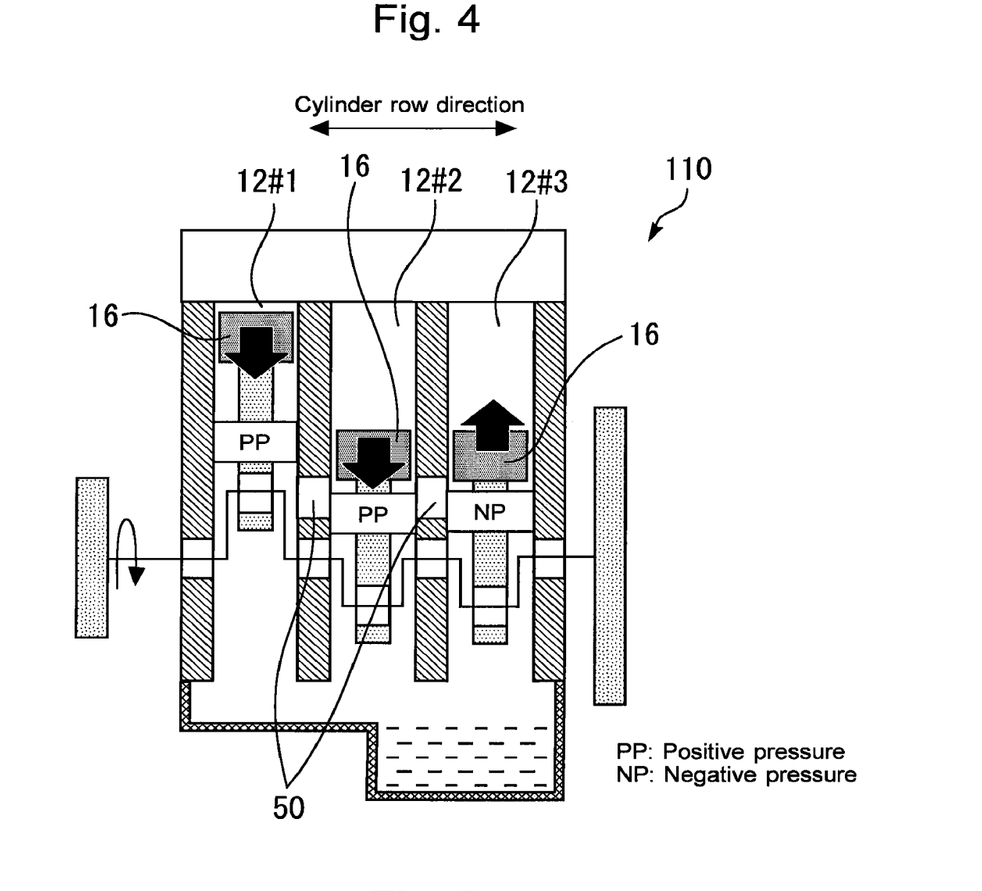
FIG. 4 is a schematic diagram for describing a problem on reduction of pumping loss in an in-line three-cylinder engine.
Figure 5:
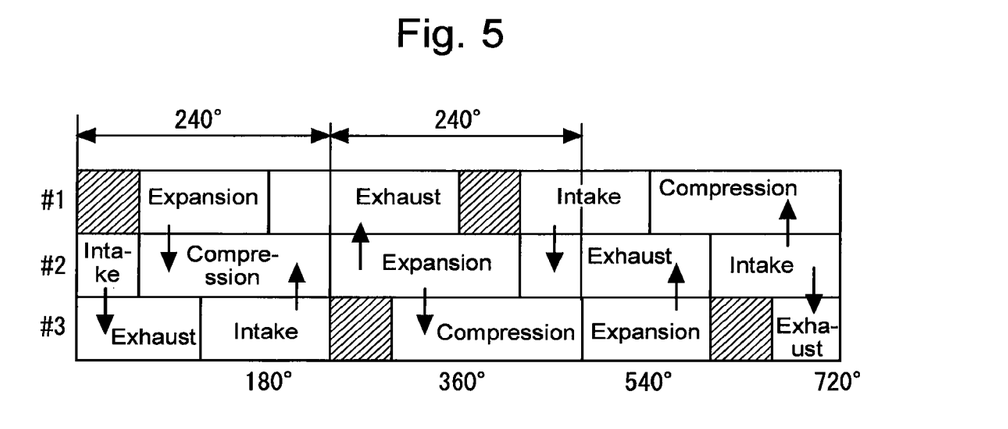
FIG. 5 is a diagram that illustrates the relationship between piston positions of the respective cylinders of the in-line three-cylinder engine and the crank angle.
Figure 6:
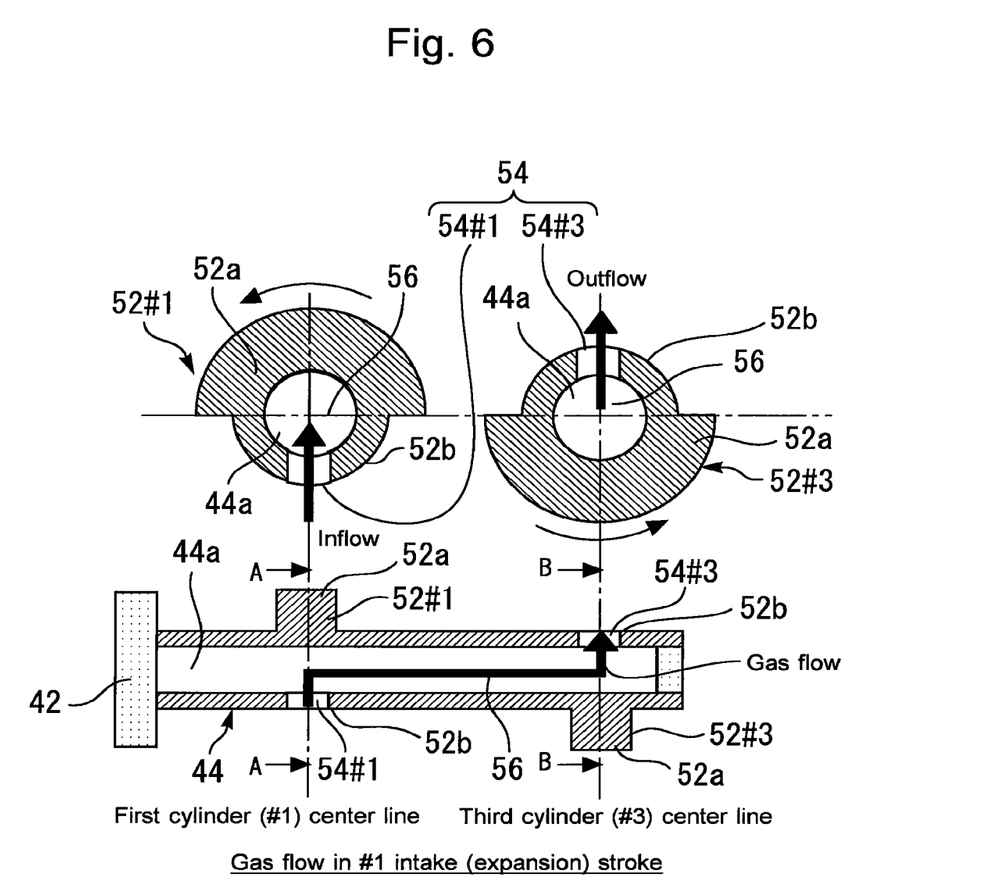
FIG. 6 is a schematic diagram for describing a detailed configuration around a balancer shaft shown in FIG. 1.
Figure 7:
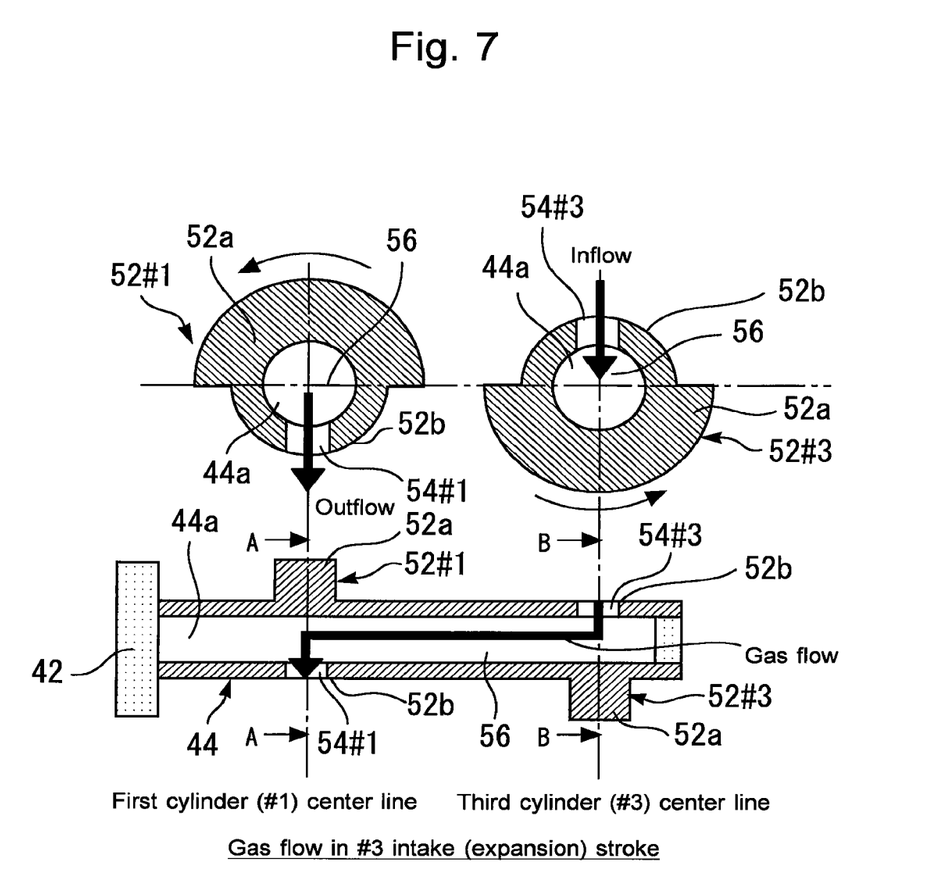
FIG. 7 is a schematic diagram that illustrates a gas flow of a communication passage during a crank angle period in which a piston of third cylinder is descending (that is, intake stroke or expansion stroke)

FIG. 4 is a schematic diagram for describing a problem on reduction of the pumping loss in an in-line three-cylinder engine. FIG. 5 is a diagram that illustrates the relationship between the piston positions of the respective cylinders of the in-line three-cylinder engine and the crank angle. An in-line three-cylinder internal combustion engine 110 shown in FIG. 4 is similar to the internal combustion engine 10 according to the present embodiment shown in FIG. 1 except that the configuration described later with reference to FIGS. 6 and 7 is not provided.

According to the in-line three-cylinder internal combustion engine 110, the phase difference between the piston 16 in a cylinder (12#1 or 12#3) arranged at an end in its cylinder row direction and the piston 16 in its adjacent cylinder (12#2) is 240 degrees. In other words, in the internal combustion engine 110, there is a crank angle period in which the piston 16 in the cylinder (first cylinder 12#1 or third cylinder 12#3) arranged at each end portion in the cylinder row direction and the piston 16 in the second cylinder 12#2 that is the adjacent cylinder move in the same direction. The hatching shown in FIG. 5 exhaustively represents this kind of crank angle periods, in which the relevant pistons 16 descend.

In the crank angle period indicated by hatching in FIG. 5, a positive in-crank-chamber pressure in the cylinder (first cylinder 12#1 or third cylinder 12#3) arranged at an end in its cylinder row direction cannot be released, via the through-hole 50 (50#12 or 50#23), toward its adjacent cylinder (second cylinder 12#2) in which the in-crank-chamber pressure becomes similarly positive. This causes a pumping loss.

It should be noted that this kind of problem itself may arise even if the through-holes 50 are not provided. This is because a release of the positive pressure toward the crank chamber 32#2 is disturbed at a location of the crank chamber 32#1 or 32#3 on the side lower than the through-hole 50. In addition, the positive in-crank-chamber pressure itself of the second cylinder 12#2 can be effectively released, by the use of the through-hole 50, via the cylinder (third cylinder 12#3 or first cylinder 12#1) arranged at the other end in the cylinder row direction.

1-3. Characteristic Configuration According to First Embodiment

According to the in-line three-cylinder internal combustion engine 10 shown in FIG. 1, three cylinders 12 correspond to an example of "three or more cylinders" according to the present disclosure. In addition, when the first cylinder 12#1 is regarded as the "A cylinder" according to the present disclosure, the second cylinder 12#2 corresponds to "the cylinder B arranged adjacent to the cylinder A" according to the present disclosure and the third cylinder 12#3 corresponds to "a cylinder C provided with a piston that moves in a direction opposite to a piston of the cylinder A during a crank angle period in which the piston of the cylinder A and a piston of the cylinder B move in a same direction" according to the present disclosure. Furthermore, when the third cylinder 12#3 is regarded as "the cylinder A" according to the present disclosure, the second cylinder 12#2 and the first cylinder 12#1 correspond to "the cylinder B and the cylinder C" according to the present disclosure, respectively.

As shown in FIG. 1, the balancer shaft 44 is arranged so as to extend from the first cylinder 12#1 to the third cylinder 12#3 along the cylinder row direction in the crank chamber 32. A pair of unbalance masses 52 for reducing engine vibration is provided on the balancer shaft 44. In other words, a part of the balancer shaft 44 is configured as the pair of unbalance masses 52. Each of the unbalance masses 52 is formed so as to be eccentric in mass with respect to the axial center of the balancer shaft 44.

For ease of description, one of the pair of unbalance masses 52 is referred to as a "first unbalance mass" 52#1 and the other is referred to as a "second unbalance mass" 52#3. In the example shown in FIG. 1, the first unbalance mass 52#1 is provided on the balancer shaft 44 at a location associated with the first cylinder 12#1 (which corresponds to an example of the "first location" according to the present disclosure) in the cylinder row direction. In addition, the second unbalance mass 52#3 is provided on the balancer shaft 44 at a location associated with the third cylinder 12#3 (which corresponds to an example of the "second location" according to the present disclosure) in the cylinder row direction.

Additionally, in the example shown in FIG. 1, each of the unbalance masses 52#1 and 52#3 is provided so as to be located at the middle of the cylinders 12#1 and 12#3 in the cylinder row direction (in more detail, the center positions of the unbalance masses 52#1 and 52#3 in their width direction coincide with the respective cylinder center lines).

FIG. 6 is a schematic diagram for describing a detailed configuration around the balancer shaft 44 shown in FIG. 1. It should be noted that the figures located on the upper side in FIG. 6 respectively correspond to an A-A line cross-sectional view and a B-B line cross-sectional view of the figure shown on the lower side.

The unbalance masses 52#1 and 52#3 are formed integrally with the balancer shaft 44, as an example. In detail, according to the example shown in FIG. 6, each of the unbalance masses 52#1 and 52#3 is provided with a weight portion 52a and a concave portion 52b.

The weight portions 52a are formed so as to protrude outward in the radial direction of the balancer shaft 44 at a part of the balancer shaft 44 in the circumferential direction. The "part" of the balancer shaft 44 in the circumferential direction in this example is half (180 degrees) in the circumferential direction. That is to say, each of the weight portions 52a has a half cylinder shape. Each of the concave portions 52b corresponds to a portion other than the weight portion 52a in the circumferential direction. In addition, the respective weight portions 52a of the unbalance masses 52#1 and 52#3 are formed so as to mutually have a phase difference of 180 degrees. It should be noted that the formation range of the weight portion 52a may alternatively be shorter than half in the circumferential direction, and, conversely, be longer than half in the circumferential direction.

The balancer shaft 44 includes a cavity portion 44a inside thereof. That is to say, the balancer shaft 44 has a hollow structure and the both ends thereof are closed as shown in FIG. 6.

A pair of holes 54 is formed in the concave portions 52b of the pair of unbalance masses 52. In more detail, the hole 54#1 that is one of the pair of holes 54 is formed on the outer surface of one of the concave portions 52b at the "first location" described above (i.e., a location associated with the first cylinder 12#1 in the cylinder row direction (i.e., the axial direction of the balancer shaft 44)). Similarly, the other hole 54#3 is formed on the outer surface of the other concave portion 52b at the "second location" described above (i.e., a location associated with the third cylinder 12#3 in the cylinder row direction (i.e., the axial direction of the balancer shaft 44)). In addition, according to the example shown in FIG. 6, the pair of holes 54 is formed so as to be located at the middle of the concave portions 52b with respect to the circumferential direction of the balancer shaft 44.

Moreover, each of holes 54#1 and 54#3 is formed so as to penetrate between the outer surface of the concave portion 52b and the inner surface thereof. Thus, inside the balancer shaft 44, a communication passage 56 for causing the crank chamber 32#1 of the first cylinder 12#1 and the crank chamber 32#3 of the third cylinder 12#3 to communicate with each other is formed by the use of the pair of holes 54#1 and 54#3 and the cavity portion 44a which communicates therewith.

In the configuration shown in FIG. 6, the opening of the hole 54#1 at the outer surface of the concave portion 52b of the first unbalance mass 52#1 corresponds to an example of "the first opening formed on the outer surface of the balancer shaft at the first location" according to the present disclosure. Similarly, the opening of the hole 54#3 at the outer surface of the concave portion 52b of the second unbalance mass 52#3 corresponds to an example of "the second opening formed on the outer surface of the balancer shaft at the second location" according to the present disclosure. Consequently, the communication passage 56 is formed inside the balancer shaft 44 so as to connect the "first opening" and the "second opening".

Figure 8:
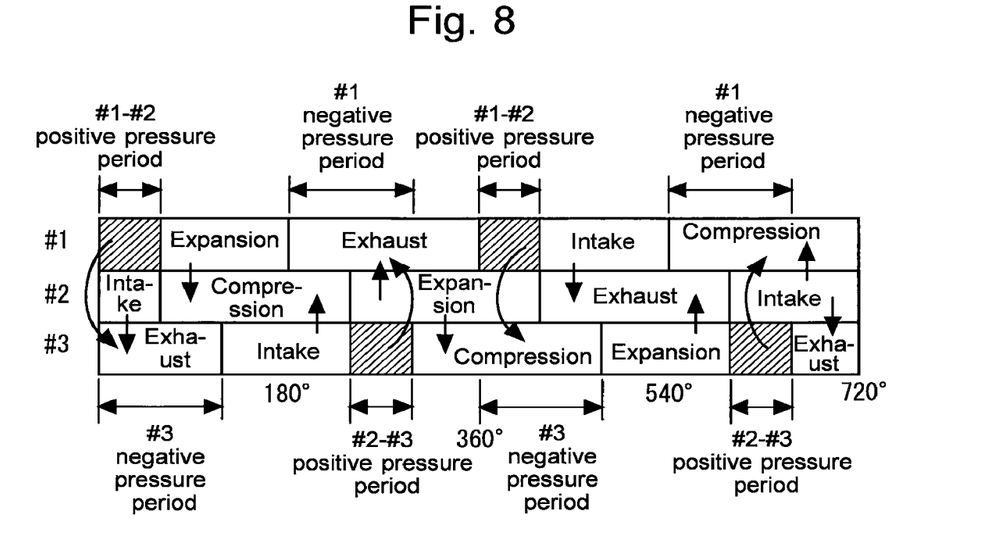
FIG. 8 is a diagram for describing advantageous effects of the characteristic configuration according to the first embodiment of the present disclosure.

1-4. Advantageous Effects of Characteristic Configuration According to First Embodiment FIG. 7 is a schematic diagram that illustrates a gas flow of the communication passage 56 during a crank angle period in which the piston 16 of the third cylinder 12#3 is descending (that is, intake stroke or expansion stroke). FIG. 8 is a diagram for describing advantageous effects of the characteristic configuration according to the first embodiment of the present disclosure.

1-4-1. Example of First Cylinder (#1) Being in Intake Stroke or Expansion Stroke FIG. 6 described above indicates a gas flow of the communication passage 56 during the crank angle period in which the piston 16 of the first cylinder 12#1 is descending (that is, intake stroke or expansion stroke). During this crank angle period, the in-crank-chamber pressure of the first cylinder 12#1 becomes positive. Also, this crank angle period includes a crank angle period in which, since the third cylinder 12#3 is in the compression stroke or the exhaust stroke as shown in FIG. 8 (i.e., since the piston 16 of the third cylinder 12#3 is ascending), the in-crank-chamber pressure in the third cylinder 12#3 becomes negative (hereunder, referred to as a "#3 negative pressure period").

Moreover, the #3 negative pressure period described above includes a crank angle period in which the in-crank-chamber pressure in the first cylinder 12#1 and the in-crank-chamber pressure in the second cylinder 12#2 simultaneously become positive (hereunder, referred to as a "#1-#2 positive pressure period"). According to the balancer shaft 44 provided with the communication passage 56 described above, in the #1-#2 positive pressure period indicated by hatching, a positive pressure gas flows into the communication passage 56 from the hole 54#1 that opens to the crank chamber 32#1 as shown in FIG. 6. Furthermore, the gas that has flown therein passes through the cavity portion 44a and thereafter flows out from the hole 54#3 into the crank chamber 32#3 being under negative pressure.

Therefore, according to the communication passage 56 of the present embodiment, the positive in-crank-chamber pressure in the first cylinder 12#1 can be released to the third cylinder 12#3 during the #1-#2 positive pressure period in which the positive in-crank-chamber pressure in the first cylinder 12#1 cannot be released to its adjacent cylinder (second cylinder 12#2).

1-4-2. Example of Third Cylinder (#3) Being in Intake Stroke or Expansion Stroke On the other hand, during a crank angle period in which the piston 16 of the third cylinder 12#3 is descending (i.e., intake stroke or expansion stroke), the in-crank-chamber pressure in the third cylinder 12#3 becomes positive. Similarly to the above description concerning the first cylinder 12#1, this crank angle period includes a crank angle period (#1 negative pressure period) in which, since the first cylinder 12#1 is in the compression stroke or the exhaust stroke as shown in FIG. 8 (i.e., since the piston 16 of the first cylinder 12#1 is ascending), the in-crank-chamber pressure in the first cylinder 12#1 becomes negative. Also, this #1 negative pressure period includes a crank angle period in which the in-crank-chamber pressure in the third cylinder 12#3 and the in-crank-chamber pressure in the second cylinder 12#2 simultaneously become positive (hereunder, referred to as a "#2-#3 positive pressure period").

According to the balancer shaft 44 provided with the communication passage 56 described above, in the #2-#3 positive pressure period indicated by hatching, a positive pressure gas flows into the communication passage 56 from the hole 54#3 that opens to the crank chamber 32#3 as shown in FIG. 8. Furthermore, the gas that has flown therein passes through the cavity portion 44a and thereafter flows out from the hole 54#1 into the crank chamber 32#1 being under negative pressure. Therefore, according to the communication passage 56 of the present embodiment, similarly to the #1-#2 positive pressure period, the positive in-crank-chamber pressure in the third cylinder 12#3 can be released to the first cylinder 12#1 during the #2-#3 positive pressure period in which the positive in-crank-chamber pressure in the third cylinder 12#3 cannot be released to its adjacent cylinder (second cylinder 12#2).

1-4-3. Summary

As described so far, according to the internal combustion engine 10 of the present embodiment, inside existing balancer shaft 44 for the internal combustion engine 10, the communication passage 56 for causing the crank chamber 32#1 of the first cylinder 12#1 and the crank chamber 32#3 of the third cylinder 12#3 that corresponds to its non-adjacent cylinder to communicated with each other is formed. Therefore, the pressure differences (pressure fluctuation) between cylinders that are produced due to the ascent and descent of the pistons 16 can be reduced between non-adjacent cylinders (i.e., between the first cylinder 12#1 and the third cylinder 12#3) without causing an increase of size of the internal combustion engine 10. As a result, the pumping loss can be reduced while avoiding reduction of the mounting ability of the internal combustion engine 10 on the vehicle.

Furthermore, the internal combustion engine 10 according to the present embodiment is also provided with the through-holes 50 (50#12 and 50#23) for causing the portions of the crank chamber 32 to communicate between adjacent cylinders. Because of this, the pressure differences (pressure fluctuation) between cylinders that are produced due to the ascent and descent of the pistons 16 can be reduced also between adjacent cylinders. As a result, according to the internal combustion engine 10 provided with the communication passage 56 as well as this kind of through-holes 50, the pumping loss can be reduced more effectively while avoiding reduction of the mounting ability of the internal combustion engine 10 on the vehicle.

Second Embodiment

Next, a second embodiment according to the present disclosure will be described with reference to FIG. 9.

2-1. Characteristic Configuration According to Second Embodiment

Figure 9:
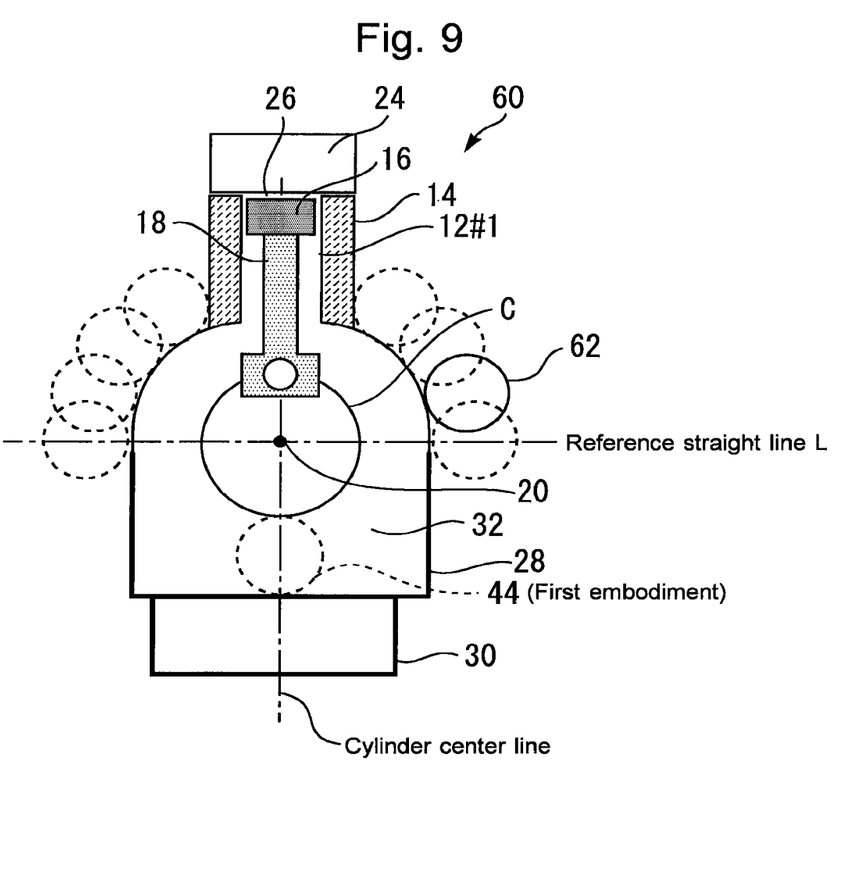
FIG. 9 is a schematic diagram for describing a characteristic configuration of an internal combustion engine according to a second embodiment of the present disclosure.

FIG. 9 is a schematic diagram for describing a characteristic configuration of an internal combustion engine 60 according to the second embodiment of the present disclosure. The internal combustion engine 60 according to the present embodiment is configured similarly to the internal combustion engine 10 according to the first embodiment described above except for points described below. FIG. 9 corresponds to a cross-sectional view of the internal combustion engine 60 taken along a plane that includes the cylinder center line of a certain cylinder (for example, the first cylinder 12#1) and that is perpendicular to the center axis line of the crankshaft 20. It should be noted that a circle shown with a symbol C in FIG. 9 corresponds to the locus of the center point of the crank pin 22.

As shown by a broken line in FIG. 9, the balancer shaft 44 according to the first embodiment is arranged in the crank chamber 32 at a location on the side lower than the center of the crankshaft 20 (i.e., on the side opposite to the combustion chamber 26) in a direction along the cylinder center line.

In contrast to this, in the view of a balancer shaft 62 according to the present embodiment from the axial direction of the crankshaft 20, the balancer shaft 62 is arranged such that the center of the balancer shaft 62 is located on the side closer to the combustion chamber 26 relative to a reference straight line L that passes through the center of the crankshaft 20 and that is perpendicular to the cylinder center line.

It should be noted that the balancer shaft 62 according to the present embodiment may be arranged at arbitrary locations as long as the center of the balancer shaft 62 is located on the side closer to the combustion chamber 26 relative to the reference straight line L or located on the reference straight line L. Thus, the balancer shaft 62 may alternatively be, for example, arranged at a location of any one of a plurality of circles shown by broken lines in FIG. 9, instead of the location of a circle shown by a solid line in FIG. 9. Furthermore, it is supposed that the balancer shaft 62 is provided with the pair of unbalance masses 52, the pair of holes 54 and the communication passage 56, similarly to the balancer shaft 44.

2-2. Advantageous Effects of Characteristic Configuration According to Second Embodiment If a balancer shaft is installed on the side lower than the reference straight line L as with the balancer shaft 44 shown in FIG. 1, the following problem may arise. Specifically, there is a possibility that, when the oil moves in a certain direction due to the centrifugal force at the time of a cornering or a hard braking of the vehicle since the balancer shaft is located near the oil surface in the oil pan 30, the communication passage 56 may be blocked by the oil scattered in the crank chamber 32. In addition, at the time of a high engine speed, the amount of the oil that falls toward the oil pan 30 increases. Therefore, there is a possibility that, at the time of the high engine speed, the communication passage 56 may also be blocked by the oil scattered in the crank chamber 32.

If the communication passage 56 is blocked by the oil due to the reasons as described above, it becomes impossible to reduce the pumping loss by the use of the communication passage 56. In contrast to this, the balancer shaft 62 according to the present embodiment is provided at a location on the side closer to the combustion chamber 26 relative to the reference straight line L. This makes it possible to provide the communication passage 56 such that the obstruction by the oil as described above becomes harder to be produced. Thus, according to the internal combustion engine 60 of the present embodiment, the pumping loss can be reduced more surely by the use of the communication passage 56 at the time of a cornering or a hard braking of the vehicle or at the time of a high engine speed.

Furthermore, as described above, the positive pressure and negative pressure that are produced in the crank chamber 32 due to the ascent and descent of the pistons 16 become higher at a location closer to the piston 16. The balancer shaft 62 of the present embodiment can cause a portion with a higher in-crank-chamber pressure and a portion with a lower in-crank-chamber pressure to communicate with each other by the use of the communication passage 56, as compared to the balancer shaft 44 according to the first embodiment. The pumping loss can therefore be reduced more effectively.

Third Embodiment

Figure 10:
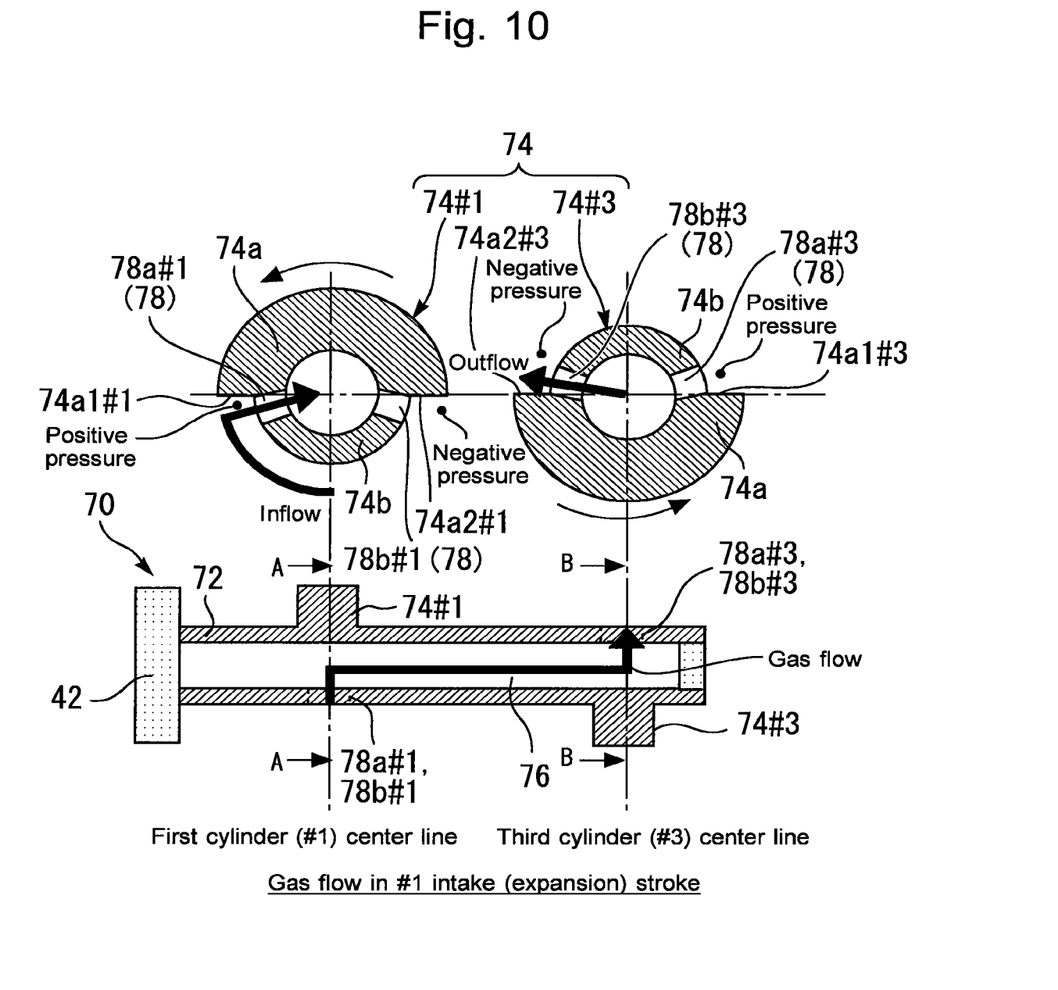
FIG. 10 is a schematic diagram for describing a characteristic configuration of a balancer device according to a third embodiment of the present disclosure.
Figure 11:
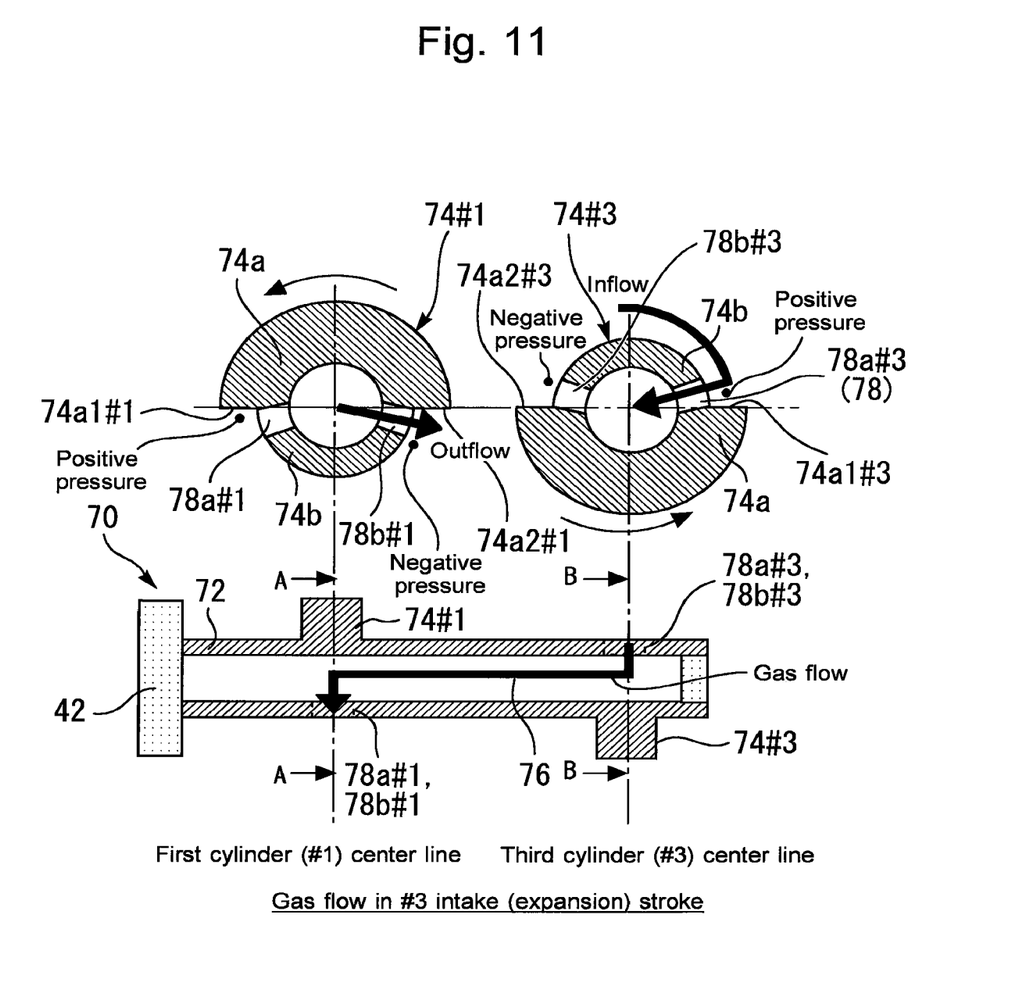
FIG. 11 is a schematic diagram that illustrates a gas flow of a communication passage 76 during a crank angle period in which the piston of the third cylinder is descending (that is, intake stroke or expansion stroke).

Next, a third embodiment according to the present disclosure will be described with reference to FIGS. 10 and 11.
3-1. Characteristic Configuration According to Third Embodiment FIG. 10 is a schematic diagram for describing a characteristic configuration of a balancer device 70 according to the third embodiment of the present disclosure. The internal combustion engine according to the present embodiment is configured similarly to the internal combustion engine 10 according to the first embodiment described above except that the balancer device 70 described below is installed instead of the balancer device 40 described above.

The balancer device 70 is equipped with a balance shaft 72. A pair of unbalance masses 74 (74#1 and 74#3) is provided on the balancer shaft 72 at the "first location" described above (that is, the location associated with the first cylinder 12#1 in the cylinder row direction) and at the "second location" (that is, the location associated with the third cylinder 12#3 in the cylinder row direction), similarly to the balancer shaft 44. In more detail, each of the unbalance masses 74#1 and 74#3 includes a weight portion 74a and a concave portion 74b similarly to the unbalance masses 52.

Furthermore, a communication passage 76 is formed inside the balancer shaft 72 similarly to the communication passage 56. The balancer shaft 72 is different from the balancer shaft 44 in teams of locations of holes 78 having a first opening and second opening of the communication passage 76.

That is to say, according to the example shown in FIG. 10, the holes 78 are formed in the concave portions 74b of the unbalance masses 74, similarly to the holes 54. On that basis, the holes 78 are composed of two holes 78a#1 and 78b#1 having the respective openings (first openings) of the communication passage 76 that are located on the side of the first cylinder 12#1 and two holes 78a#3 and 78b#3 having the respective openings (second openings) of the communication passage 76 that are located on the side of the third cylinder 12#3.

To be more specific, the respective openings (first openings) of the two holes 78a#1 and 78b#1 located on the side of the first cylinder 12#1 are provided in the concave portion 74b so as to be adjacent to the respective end surfaces 74a1#1 and 74a2#1 of the weight portion 74a of the first unbalance mass 74#1 in the circumferential direction of the balancer shaft 72. Similarly, the respective openings (second openings) of the two holes 78a#3 and 78b#3 located on the side of the third cylinder 12#3 are provided in the concave portion 74b so as to be adjacent to the respective end surfaces 74a1#3 and 74a2#3 of the weight portion 74a of the second unbalance mass 74#3 in the circumferential direction of the balancer shaft 72. In addition, as an example, in the view of the balancer shaft 72 from its axial direction, the individual end surfaces 74a1#1, 74a2#1, 74a1#3 and 74a2#3 are formed as a plane that is parallel to the radial direction of the balancer shaft 72.
3-2. Advantageous Effects of Characteristic Configuration According to Third Embodiment If the balancer shaft 72 rotates in the rotational direction shown in FIG. 10, the following pressure difference is produced around the holes 78. More specifically, a positive pressure is produced, by the effect of the shape of the weight portion 74a, around the hole 78a#1 that is adjacent to the end surface 74a1#1 of the first unbalance mass 74#1. On the other hand, a negative pressure is produced, by the effect of the shape of the weight portion 74a, around the hole 78a#1 that is adjacent to the other end surface 74a2#1 of the first unbalance mass 74#1. Similarly, a positive pressure and a negative pressure are produced around the holes 78a#3 and 78b#3 located on the side of the third unbalance mass 74#3 as shown in FIG. 10.
3-2-1. Example of First Cylinder (#1) Being in Intake Stroke or Expansion Stroke Similarly to FIG. 6, FIG. 10 indicates a gas flow of the communication passage 76 during the crank angle period in which the piston 16 of the first cylinder 12#1 is descending (that is, intake stroke or expansion stroke). According to the balancer shaft 72 of the present embodiment, by the use of the above-described positive pressure and negative pressure produced in the vicinity of the holes 78, the inflow of the gas into the communication passage 76 and the outflow of the gas from the communication passage 76 can be more promoted as compared to the communication passage 56 of the balancer shaft 44 according to the first embodiment.

That is to say, as shown in FIG. 10, at the side of the first cylinder 12#1, the hole 78a#1 on the positive pressure side functions as an inlet of the communication passage 76, and, at the side of the third cylinder 12#3, the hole 78b#3 on the negative pressure side functions as an outlet of the communication passage 76. Thus, the gas flow can be more effectively produced in the communication passage 76 during the #1-#2 positive pressure period.
3-2-2. Example of Third Cylinder (#3) Being in Intake Stroke or Expansion Stroke FIG. 11 is a schematic diagram that illustrates a gas flow of the communication passage 76 during a crank angle period in which the piston 16 of the third cylinder 12#3 is descending (that is, intake stroke or expansion stroke). In this crank angle period, conversely to the example shown in FIG. 10, at the side of the third cylinder 12#3, the hole 78a#3 on the positive pressure side functions as an inlet of the communication passage 76, and, at the side of the first cylinder 12#1, the hole 78b#1 on the negative pressure side functions as an outlet of the communication passage 76. Thus, the gas flow can also be more effectively produced in the communication passage 76 during the #2-#3 positive pressure period, similarly to the #1-#2 positive pressure period.
3-2-3. Summary As described so far, according to the internal combustion engine of the present embodiment provided with the balancer shaft 72, the gas flow can be more effectively produced in the communication passage 76 by the use of the holes 78 formed in the concave portions 74b as described above. The pumping loss can therefore be reduced more effectively.

3-3. Modification Example Concerning Third Embodiment

In the third embodiment described above, as shown in FIG. 10, the holes 78a#1, 78b#1, 78a#3 and 78b#3 that each include the first opening or second opening of the communication passage 76 are provided closer to the respective end surfaces 74a1#1, 74a2#1, 74a1#3 and 74a2#3 of the weight portions 74a of the unbalance masses 74. However, these holes 78 may not always be adjacent to the respective end surfaces 74a1#1, 74a2#1, 74a1#3 and 74a2#3, and, instead, may alternatively be arranged closer to the respective end surfaces 74a1#1, 74a2#1, 74a1#3 and 74a2#3.

4. Other Embodiments 4-1. Other Examples of Number of Cylinders of Internal Combustion Engine In the first to third embodiments described above, the examples of the in-line three-cylinder internal combustion engines 10 and 60 have been described. However, the internal combustion engines applied to the present disclosure are not limited to the example described above as long as the following requirement is met. This requirement means that the internal combustion engines include: three or more cylinders arranged in a row in a cylinder row direction; and a balancer device for reducing engine vibration, and that the three or more cylinders include: a cylinder A arranged at an end in the cylinder row direction; a cylinder B arranged adjacent to the cylinder A; and a cylinder C provided with a piston that moves in a direction opposite to a piston of the cylinder A during a crank angle period in which the piston of the cylinder A and a piston of the cylinder B move in the same direction as each other.

That is to say, the internal combustion engines applied to the present disclosure may be an internal combustion engine that includes five or more cylinders as long as the requirement described above is met. In addition, depending on the number of cylinders of an internal combustion engine to which the present disclosure is applied, the cylinder B and the cylinder C described above may not always be adjacent to each other as with the second cylinder 12#2 and third cylinder 12#3 in the in-line three-cylinder type.

Furthermore, the internal combustion engines applied to the present disclosure are not limited to be the in-line type as long as the requirement described above is met, and may alternatively be, for example, a V-type engine, such as a V-type six-cylinder engine. More specifically, the "three or more cylinders" described above are not limited to all cylinders of an internal combustion engine, and, for example, three cylinders of each bank correspond to the "three or more cylinders". It should be noted that, although the examples in which one balancer shaft 44 or 72 is used have been described in the first to third embodiments, the number of the balancer shafts according to the present disclosure is not limited to the example described above and may alternatively be plural.

4-2. Other Examples of Installation Portions of "First Opening" and "Second Opening" According to the Present Disclosure In the first to third embodiments, the examples in which the holes 54 or 78 that each have an opening corresponding to the "first opening and the "second opening" according to the present disclosure are formed in the concave portions 52b or 74b of the unbalance masses 52 or 74 have been described. However, the "first opening and the "second opening" according to the present disclosure may not always be formed in the first and second unbalance masses. Thus, the "first opening and the "second opening" may alternatively be formed in an outer surface of a balancer shaft other than portions at which the first and second unbalance masses are provided. Furthermore, the "first opening and the "second opening" may alternatively be, for example, formed in the weight portions of the first and second unbalance masses, instead of the concave portions thereof.

The embodiments and modifications described above may be combined in other ways than those explicitly described above as required and may be modified in various ways without departing from the scope of the present disclosure.

What is claimed is:

1. An internal combustion engine, comprising:
three or more cylinders arranged in a row in a cylinder row direction; and
a balancer device for reducing engine vibration,
wherein the three or more cylinders include: a cylinder A arranged at an end in the cylinder row direction; a cylinder B arranged adjacent to the cylinder A; and a cylinder C provided with a piston that moves in a direction opposite to a piston of the cylinder A during a crank angle period in which the piston of the cylinder A and a piston of the cylinder B move in a same direction as each other,
wherein the balancer device includes a balancer shaft arranged so as to extend from the cylinder A to the cylinder C along the cylinder row direction in a crank chamber, and
wherein the balancer shaft includes:
a first opening formed on an outer surface of the balancer shaft at a first location associated with the cylinder A in the cylinder row direction;
a second opening formed on the outer surface of the balancer shaft at a second location associated with the cylinder C in the cylinder row direction; and
a communication passage formed inside the balancer shaft so as to connect the first opening with the second opening.

2. The internal combustion engine according to claim 1, wherein the balancer shaft is arranged such that, in a view of the balancer shaft from an axial direction of a crankshaft, a center of the balancer shaft is located on a reference straight line or on a side closer to a combustion chamber relative to the reference straight line, the reference straight line passing through a center of the crankshaft and being perpendicular to a cylinder center line.

3. The internal combustion engine according to claim 1, wherein the balancer shaft includes:
a first unbalance mass provided on the balancer shaft at the first location; and
a second unbalance mass provided on the balancer shaft at the second location, and
wherein the first opening is formed on the first unbalance mass and the second opening is formed on the second unbalance mass.

4. The internal combustion engine according to claim 3, wherein each of the first unbalance mass and the second unbalance mass includes:
a weight portion protruded outward in a radial direction of the balancer shaft at a part of the balancer shaft in its circumferential direction; and
a concave portion that is a portion other than the weight portion in the circumferential direction, and wherein the first opening is formed on the concave portion of the first unbalance mass and the second opening is formed on the concave portion of the second unbalance mass.

5. The internal combustion engine according to claim 4, wherein the first opening is formed on the concave portion so as to be adjacent to or closer to each end surface of the weight portion of the first unbalance mass in the circumferential direction, and wherein the second opening is formed on the concave portion so as to be adjacent to or closer to each end surface of the weight portion of the second unbalance mass in the circumferential direction.

* * * * *